United States Patent [19]

Soran

[11] 4,114,526
[45] Sep. 19, 1978

[54] APPARATUS FOR DENATURING FOOD PRODUCTS NOT INTENDED FOR HUMAN CONSUMPTION

[75] Inventor: Robert L. Soran, Modesto, Calif.

[73] Assignee: Pet Foods, Modesto, Calif.

[21] Appl. No.: 664,149

[22] Filed: Mar. 5, 1976

[51] Int. Cl.² .............................................. A23L 1/275
[52] U.S. Cl. ....................................... 99/533; 426/250
[58] Field of Search ............. 141/105, 9, 83, 100–104, 141/250–284, 392; 99/532, 533; 252/365; 17/51; 426/250, 132, 177, 224, 656; 264/73, 75, 76, 77; 177/60

[56] References Cited

U.S. PATENT DOCUMENTS 3,347,287  10/1967  Geber .................................... 141/105

Primary Examiner—Houston S. Bell
Attorney, Agent, or Firm—Huebner & Worrel

[57] ABSTRACT

A method of denaturing food products not intended for human consumption including the steps of propelling such products in a flowable comminuted form in a stream, injecting a denaturing agent which is immiscible with the product into the stream so that the agent is distributed longitudinally along the stream, and thereafter accumulating the stream in a striped, striated or marbled mass; an apparatus for such purpose having a conduit, a pump for propelling such products through the conduit, a duct connected to the conduit, and a second pump for propelling the denaturing agent through the duct and into products flowing through the conduit; and the resultant improved denatured product.

4 Claims, 5 Drawing Figures

APPARATUS FOR DENATURING FOOD PRODUCTS NOT INTENDED FOR HUMAN CONSUMPTION

BACKGROUND OF THE INVENTION

The present invention relates to a method and apparatus for denaturing food products not intended for human consumption and more particularly to such a method and apparatus for marking food products, by color, odor or flavor so that the product cannot subsequently by confused with food for humans, and the resultant product.

FIELD OF THE INVENTION

In the killing; skinning, scalding, scaling, or de-feathering; processing, viscerating; cleaning; packaging; storing and marketing of animals, poultry and fish, the flesh thereof frequently becomes damaged so as to be unfit for human consumption. Further, many pre-slaughtering injuries can render the flesh unfit for human consumption as can death caused by other than slaughter. Such unfit flesh nevertheless has other uses and because of the extremely voluminous production rates in the meat, poultry and fish industries, the unfit flesh is present in very large quantities and of quite appreciable value when it can be properly diverted to other uses.

Since such unfit flesh frequently cannot be visually distinguished from flesh fit for human consumption, intricate regulations have been established requiring conspicuous marking of the unfit flesh so it can be channeled into animal food or other markets without danger of it being inadvertently consumed by humans. Such marking is known as "denaturing".

For example, meat unfit for human consumption must be slashed into chunks not larger than four inches in diameter and dyed with certain prescribed dyes which are not incompatible with animal foods or other subsequently intended products. Certain dyes such as FD&C blue Nos. 1 and 2, FD&C green No. 3, and FD&C violet No. 1 and charcoal have been governmentally approved for certain carcass parts. For other parts, FD&C yellow No. 5, tannic acid and ferric acid and other denaturing agents have been prescribed. Many are expensive. Some, such as charcoal, are difficult to handle and clog applying equipment.

The problems encountered in denaturing solid flesh are aggravated in endeavoring to denature ground or comminuted flesh. Such comminuted flesh is required not to contain more than four percent by weight of coarsely ground hard bone in pieces no smaller than the opening size specified for No. 5 mesh in the standards issued by the United States Bureau of Standards or six percent by weight of coarsely ground hard bone, in pieces no smaller than the opening specified for No. 8 mesh in said standards and the denaturing agent must be intimately mixed with all of the material to be denatured and applied in such quantity and manner that it cannot easily be removed by washing or soaking and in sufficient amount to give the material a distinctive color, odor or taste. Because of the nature of comminuted flesh, prior to the present invention sufficient denaturing agents were required to color or otherwise distinctively to mark the entire mass. Although modern equipment for de-boning meat has a demonstrated ability speedily and economically to remove flesh from bones and such flesh has long been known to have a high potential market value, its marketing has been severely restricted or precluded by the requirement that the entire mass be distinctively marked if classified as requiring denaturing.

DESCRIPTION OF THE PRIOR ART

It will be recalled that the marking of the surfaces of solid chunks of meat has been permitted if the chunks are not larger than four inches in diameter. This requires far less dye than the marking of the entire mass of comminuted meat and is economically feasible. The purpose of marking is, of course, to avoid confusion of flesh not fit for human consumption with flesh that is fit for human consumption. It has been recognized that if the comminuted flesh could be striped, striated or marbled with dye disposed in strips or blotches within four inches of each other the marking requirements could be met with enormous savings in the dye. Further, such marked comminuted flesh would be more conspicuous than uniformly dyed masses thereof. While these facts have been recognized, prior to the present invention no method or apparatus has been known that could sufficiently economically apply strips, striae, or blotches of dye to comminuted meat to be economically feasible. The broad essence of the present invention resides in the discovery of such method and apparatus.

SUMMARY OF THE INVENTION

An object of the present invention is, therefore, to denature food products more efficiently and more effectively than heretofore possible.

Another object is to permit the economical utilization of ground or comminuted meat, poultry and fish not fit for human consumption and requiring denaturing.

Another object is to provide an improved method and apparatus for denaturing meat, poultry and fish and particularly such products in flowable comminuted or ground form.

Further objects are to provide improved elements and arrangements thereof in an apparatus for denaturing meat, poultry and fish, hereinafter referred to collectively as "meat" for descriptive convenience, which is economical, speedy, effective and requires a minimum of denaturing agent to accomplish the purpose.

DESCRIPTION OF THE PREFERRED EMBODIMENT

Figure 1:
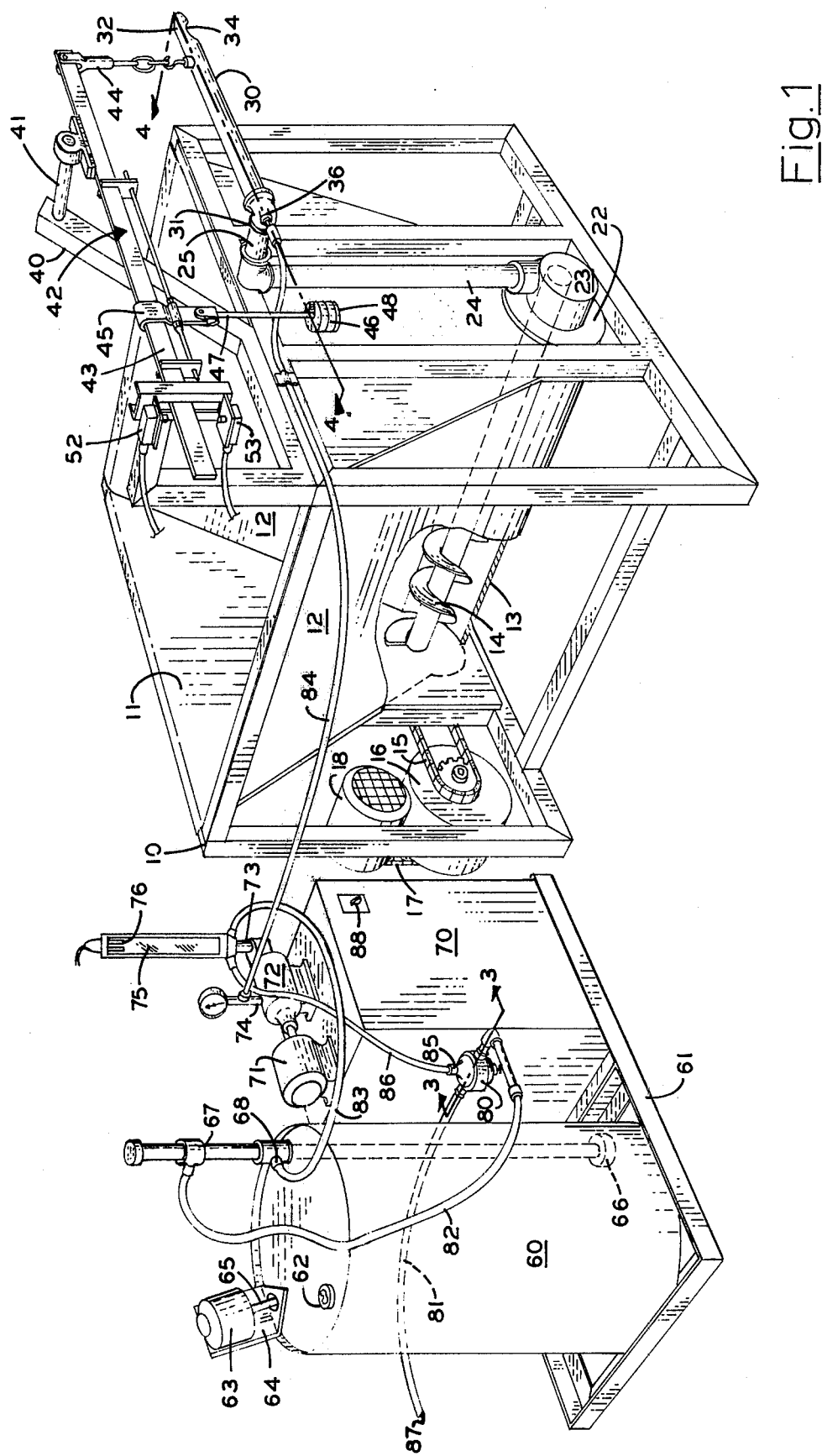
FIG. 1 is a perspective view of a preferred embodiment of the denaturing apparatus of the present invention.

As best shown in FIG. 1, any suitable frame 10 supports a receptacle or hopper 11 adapted to receive flowable comminuted meat. The receptacle has downwardly convergent side walls 12 which connect to an horizontal, semi-cylindrical conveyor housing 13. A screw conveyor 14 is rotatably mounted in the housing 13 in the usual manner and driven by a chain 15 connected to a transmission 16 driven by a chain 17 from a motor 18.

Figure 4:
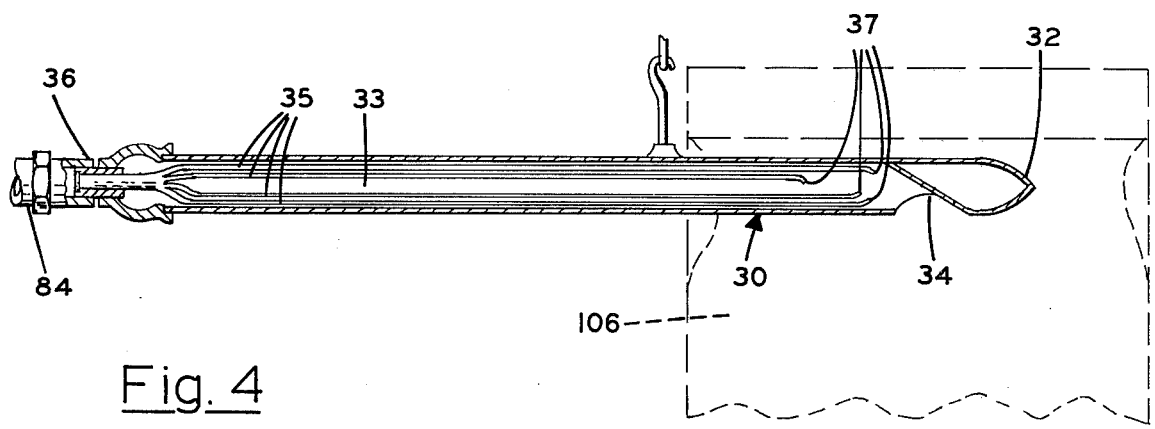
FIG. 4 is a section of the injector taken on line 4—4 of FIG. 1.

The conveyor 14 has a delivery end 22 which has driving connection to a pump 23. The pump has a discharge conduit 24 upwardly extended therefrom having a horizontal portion 25 adjacent to the top of the frame 10 which is extended outwardly therefrom in substantially parallel relation to the conveyor 14. An injector or nozzle 30 is pivotally mounted on the horizontal portion 25 of the conduit 24 by means of a fluid tight bearing 31 and is extended substantially horizontally therefrom. As best shown in FIG. 4, the injector has an extended closed end 32, an internal mixing chamber 33 which is continuous with the conduit 24 and can be considered a portion thereof, and an outlet port 34 which is downwardly disposed adjacent to the closed end 32. A plurality of ducts 35 are extended longitudinally from the injector from a single coupling 36 at the end of the injector opposite to the closed end and individually provide open ends 37 adjacent to the port 34 and preferably substantially equally spaced about the chamber 33.

Figure 2:
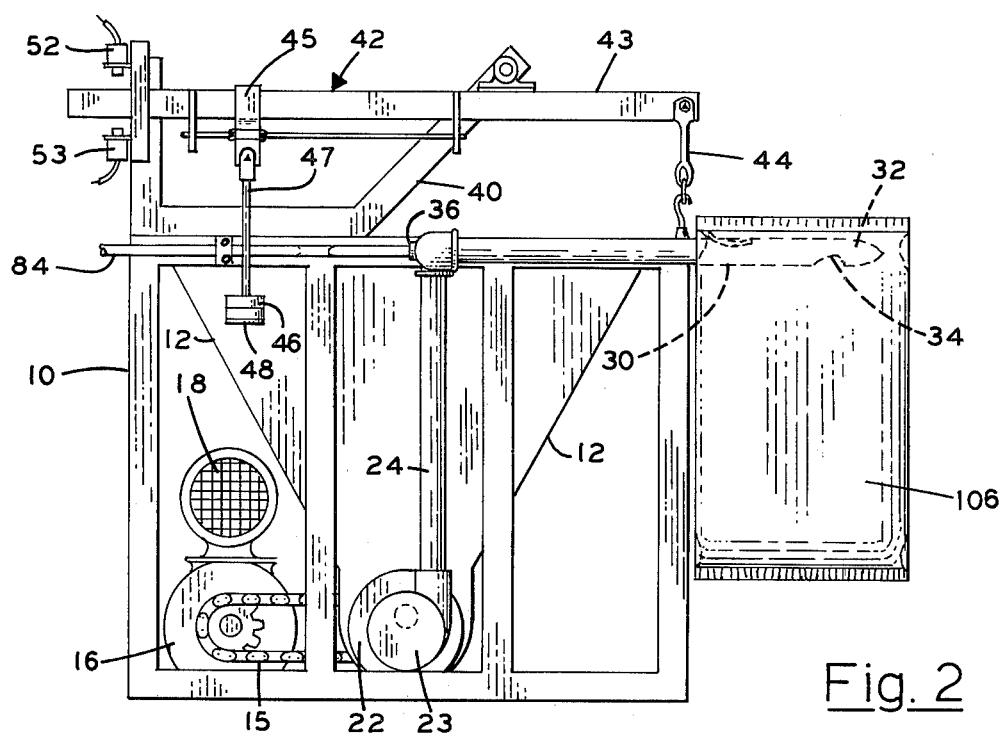
FIG. 2 is a somewhat enlarged fragmentary side elevation of the apparatus of FIG. 1 showing a bag for receiving denatured comminuted meat, an injector for injecting such meat into the bag in supporting relation to the bag and a scales in supporting relation to the injector.
Figure 3:
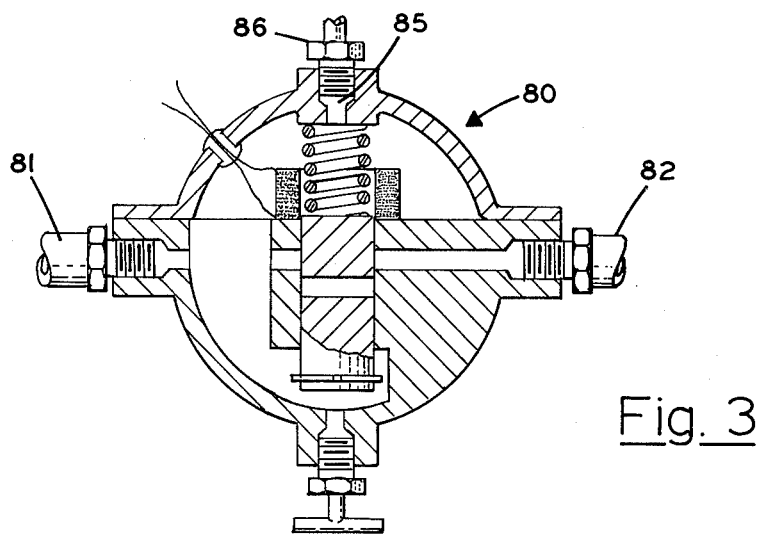
FIG. 3 is a section taken on line 3—3 of FIG. 1 showing the internal mechanism of an electrically controlled valve used in the apparatus.

As best shown in FIGS. 1 and 2, an auxiliary frame 40 is mounted on the frame 10 and upwardly extended therefrom adjacent to the injector 30. A fulcrum shaft 41 is substantially horizontally extended from the auxiliary frame transversely above the injector 30. A scales 42 is mounted on the shaft and consists of a beam 43 pivotally mounted on the shaft and oppositely extended therefrom. One end of the beam is connected to the injector 30 adjacent to the end 32 thereof in supporting relation to the injector by a linkage 44. The scales provides a slide 45 which can be adjustably positioned longitudinally on the beam 43 having selected numbers of weights 46 supported thereon by a depending rod 47 and plate 48.

It will be noted that the beam 43 of the scales 42 and the injector 30 are substantially parallel when in horizontal position. A normally closed microswitch 52 is mounted on the auxiliary frame 40 above the beam 43 in a position to be engaged and opened when the beam pivots in a clockwise direction, as viewed in FIGS. 1 and 2. Somewhat similarly, a normally open microswitch 53 is mounted on the auxiliary frame beneath the beam 43 in a position to be engaged and closed when the beam tips in a counterclockwise direction, as viewed, and is rested thereon. The significance of the switches 52 and 53 will become readily apparent in the subsequent description of the electrical, pneumatic, and hydraulic systems of the invention.

Referring again to FIG. 1, a reservoir 60 in the form of a tank, is mounted on any suitable base 61. The reservoir is intended to receive a denaturing agent, such as a dye, through a filler opening closed by a plug 62. An electric motor 63 is mounted on the reservoir 60 by means of a bracket 64 and has a shaft 65 extended into the reservoir 60 which mounts a mixing head, not shown. A pump 66 is provided in the reservoir and driven by means of a pneumatic motor 67. The pump has an outlet 68 disposed above the reservoir.

A cabinet 70 is also provided on the base 61 and provides a convenient support for an electric motor 71 having driving connection to a pump 72 used to meter denaturing agent to the injector 30. The pump has an intake 73 and an outlet 74. A sight glass 75 is connected to the intake and upwardly extended therefrom to provide an auxiliary reservoir for the pump 72. An electric probe 76 is provided in the upper end of the sight glass. As will subsequently become apparent, when a cycle of operation is initiated, the pump 66 is actuated to pump denaturing agent from the reservoir 60 to the sight glass 75 until the agent rises in the sight glass to engage the probe 76 and complete an electrical circuit therethrough which interrupts operation of the pump 66.

As best shown in FIG. 1, a solenoid valve 80 is conveniently mounted on a side of the cabinet 70. An air line 81 is connected to any suitable source of air under pressure and to the input side of the valve 80. A further air line 82 is connected to the outlet side of the valve 80 and to the pneumatic motor 67 of the pump 66. A dye conduit 83 is connected to the outlet 68 of the pump 66 and to the bottom of the sight glass 75. A dye conduit 84 interconnects the outlet 74 of the pump 72 and the coupling 36 of the injector 30. The valve 80 has an auxiliary outlet 85 from which it releases compressed air at very slow rate whenever the valve is closed and said outlet is connected to the sight glass 75 by an air line 86. The air line 81 is connected to any suitable source of air under pressure 87.

Figure 5:
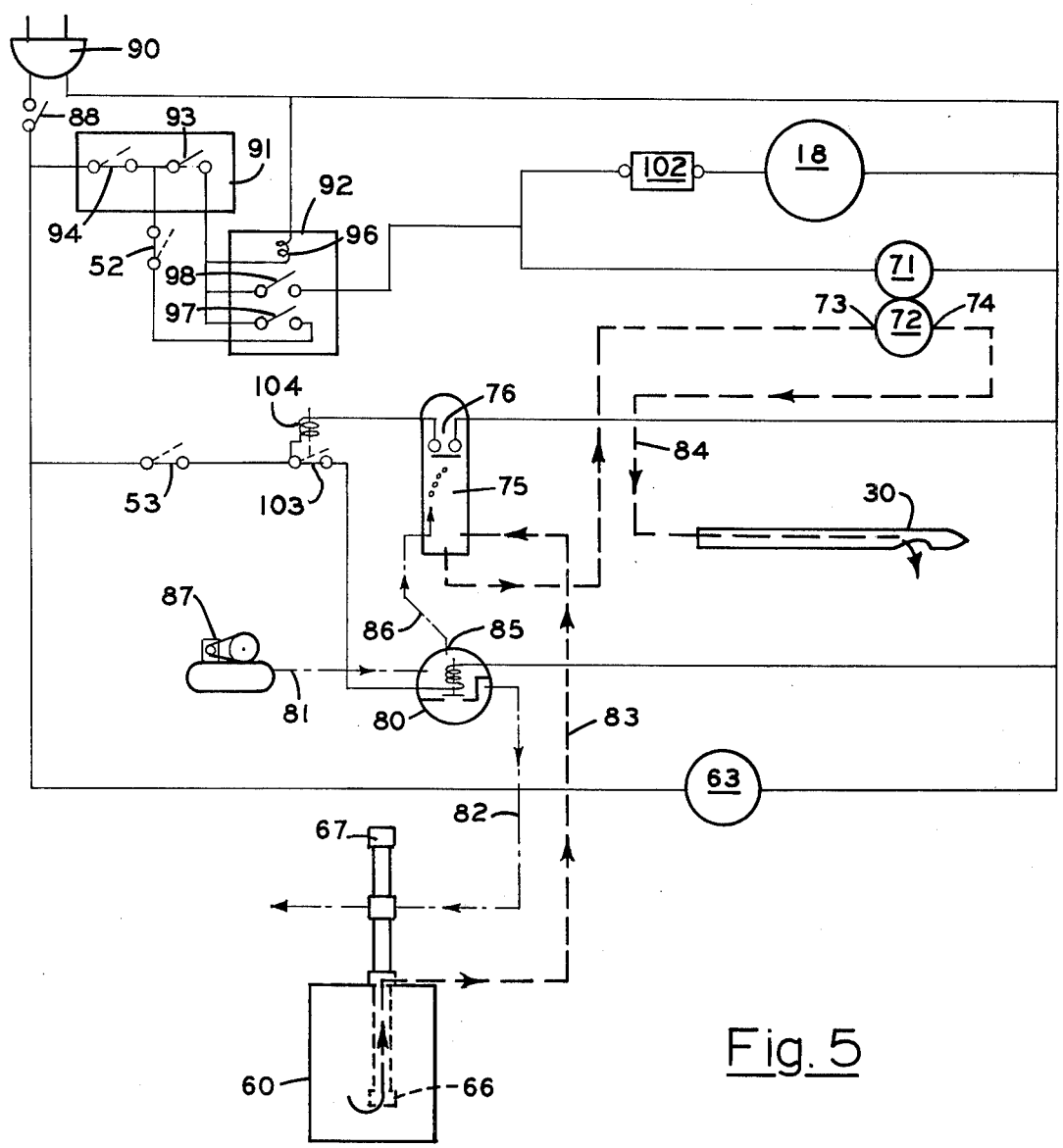
FIG. 5 is a schematic diagram of the electrical, pneumatic, and hydraulic circuits of the apparatus of FIG. 1.

In the schematic diagram of FIG. 5, electrical connections are shown in full lines, pneumatic connections in dot-dash lines and liquid dye connections in dashed lines. As best shown in FIG. 5, a master control switch 88 is connected to a suitable source of electrical energy 90. The switch 88 is connected in series with the normally closed switch 52, the normally open switch 53, a conventional "start" and "stop" switch 91 and a starter 92 across the source of electrical energy, all as will become more clearly apparent. As is well known, the "start" and "stop" switch has a "start" button represented at 93 and a "stop" button represented at 94. When the "start" button is pressed the circuit thereof is energized until the "stop" button is pressed or the switch 52 is opened by engagement of the beam 43 thereagainst. When the "stop" button is pressed, the circuit thereof is de-energized until the "start" button is pressed.

Also as is well known, the starter 92 has a control coil 96 connected in series with the start and stop buttons 93 and 94 and the switch 88 across the source of electrical energy 90. The coil 96 has controlling connection to a normally open switch or contacts 97 and normally open contacts or switch 98. The switch 97 is connected in series with the switch 52 and stop button 94 in by-pass relation to the start button 93. The stop button is normally closed but can be manually opened or automatically opened by the beam striking said button when the beam pivots in a clockwise direction as viewed. The mixing motor 63 is connected electrically in series with the switch 88 in by-pass relation to the switches 52 and 53 so that whenever the switch 88 is closed, the mixing motor 63 is energized.

When the start button 93 is pressed, the coil 96 is energized through the start and stop buttons 93 and 94. When the coil is energized, the switches 97 and 98 are closed. The motor 71 for the dye pump 72 and the motor 18 for the conveyor 14 and pump 23 are connected electrically in parallel and in turn in series with the switches 98 and 97, the switch 52 and the stop button 94. Thus, when the switches 88, 94, 52, 97 and 98 are closed, the motors 18 and 71 are energized. Since it is desired to have dye reach the injector 30 slightly in advance of the comminuted meat pumped by the pump 23, a time delay switch 102 is connected in series with the motor 18 so that it is energized a few seconds after the motor 71. The solenoid actuated valve 80 is connected electrically in series with a normally closed switch 103 and switches 53 and 88. The switch 103 has an opening solenoid 104 which is connected electrically in series with the probe 76 in parallel with the valve 80 so that whenever dye accumulates in the sight glass 75 sufficiently to bridge the probe 76, the solenoid 104 is eneregized to open the switch 103 and close the valve 80. When the dye in the sight glass 75 is depleted sufficiently that the probe no longer conducts, the solenoid 104 is de-energized and the switch 103 closes to actuate the valve 80 if the main switch 88 is closed. As mentioned, when the valve 80 is closed, a small amount of compressed air is directed through the air line 86 to bubble through the sight glass 75 to maintain the dye therein thoroughly mixed.

OPERATION

The operation of the described embodiment of the present invention and its method of utilization are believed to be clearly apparent and are briefly summarized at this point. Assuming that dye or other denaturing agent is provided in the reservoir 60 and flowable comminuted meat in the receptable 11, a sack 106 of well-known form is slid onto the nozzle or injector 30 and suspended therefrom. The sack has overlaying folds at its top between which the injector is inserted and when so positioned, the port 34 is in communication with the interior of the sack. The weights 46 are adjusted so that when the sack is so supported, the beam 43 is rested lightly on the switch 53 which is initially held closed by it.

The switch 88 is manually closed to energize the mixing motor 63 and condition the apparatus for operation. The push button 93 is pressed to initiate a cycle of operation. This also energizes coil 96 to close starter switches 97 and 98. Compressed air is admitted from the source 87 through the lines 81 and 82 to the motor 67 for the pump 66 so that dye or other denaturing agent is pumped through the dye conduit 83 to fill the sight glass 75. When the sight glass is filled, the probe 76 conducts, energizing the coil 104 and opening switch 103 to close the valve 80 and direct a small volume of compressed air through the line 86 to bubble through the sight glass 75. In this manner the agent in the sight glass is maintained in thoroughly mixed condition. The motor 71 is energized when push button 93 is pressed with the switch 88 closed to pump dye from the sight glass through the conduit 84 to the injector 30 for discharge through the ducts 35 interiorly of the nozzle. After a brief delay caused by the time delay switch 102, the motor 18 is actuated to rotate the screw conveyor 14 to deliver comminuted meat, not shown, to the pump 23 by which it is forced upwardly through the discharge conduit 24, the horizontal portion 25, for extrusion through the injector into the sack 106. As the meat is forced through the injector 30, dye emitted from the ducts 35 longitudinally stripes the extruded meat.

As the longitudinally striped stream of comminuted meat descends from the port 34 into the sack 106, it coils back and forth upon itself to form a mass of meat in the sack that is thoroughly marbled with streaks of dye markedly contrasting with the natural color of the comminuted meat. Any suitable dye may be employed for the purpose with that specified above being fully suitable for the purpose.

As the suspended sack 106 is filled, its increasing weight causes the beam 43 gradually to pivot in a clockwise direction, as viewed in FIGS. 1 and 2. This releases switch 53 to open. When the bag is filled, usually with fifty pounds of meat, the beam 43 engages and opens the switch 52, de-energizing the control coil 96 and permitting the switches 97 and 98 to close. This stops the motor 18 and the flow of comminuted meat and the motor 71 and the flow of dye. The sack 106 is then slid from the injector 30 and self seals because of the overlapping folds at the top of the sack.

When the sack 106 is removed from the injector 30, the weight 46 causes the beam to pivot in a counterclockwise direction, as viewed, to close the switch 53. It is significant that the apparatus dependably marbles a predetermined weight of comminuted meat in the sack 106 with a predetermined volume of dye. It will be noted that each sack of meat receives one, and only one, sight glass of dye. The pneumatic motor 67 can be actuated to operate the pump 66 to deliver dye from the reservoir 60 to the sight glass 75 only when the switch 53 is closed. The switch 53 is closed only when the beam 43 is rested on it. The beam 43 is rested on the switch 53 only when weight of the sack 106 and its contents is insufficient to overcome the counterbalancing effect of the weights 46. However, once the sack receives enough meat to overcome the weights 46, the switch 53 is released to open. When the switch 53 is closed, dye can be supplied to the sight glass by closing of the valve 80 to supply compressed air to the motor 67 only when the normally closed switch 103 is closed. The switch 103 is closed whenever the probe 76 is nonconductive. Thus, if the sight glass 75 does not have a full charge of dye and the valve 53 is closed, the valve 80 is opened and the motor 67 is actuated to drive the pump 66 and supply dye to the sight glass. As soon as the dye reaches a predetermined height in the sight glass, the probe 76 conducts, energizing the coil 104 to open the switch 103 to interrupt actuation of the valve 80 which closes and stops operation of the motor 67.

When a new sack 106 is slid onto the injector 30 and supported thereby, the beam 43 assumes a substantially horizontal position rested on switch 53 closing the same. The normally closed switch 52 is disengaged from the beam 43 and is similarly closed. A new cycle can then be initiated if the switch 88 is closed, by pressing the start button 93 while the switches 52 and 53 remain closed until the latter is released to open by pivotal movement of the beam 43.

It will be noted that the sight glass 75 is essentially an auxiliary reservoir permitting visual inspection of an adequate supply of dye at all times. Whenever the supply of dye in the sight glass becomes depleted with the valve 53 closed, the probe 76 fails to conduct, the opening solenoid 104 is de-energized, the switch 103 closes so as to open the valve 80 and replenish the supply of dye in the sight glass by actuating the pneumatic motor 67.

Comminuted meat denatured by the method and apparatus of the present invention is far more conspicuously marked because of the contrasting coloration of the dye in the meat than if the entire mass is dyed the same color. Far less dye is required to achieve the superior results. The dye is economically, dependably, and speedily applied to the comminuted meat making possible large volume production with an absolute minimum of condemnation for improper or inadequate denaturing. Because of the economy effected and the dependability achieved, the method and apparatus of the present invention has made possible great reductions in the cost of marking denatured food products vastly expanding the market for boned and other ground or comminuted meat, poultry and fish.

Although the invention has been shown and described in what is conceived to be the most practical and preferred method and apparatus, it is recognized that departures may be made therefrom within the scope of the invention, which is not to be limited to the illustrative details disclosed.

Having described my invention, what I claim as new and desire to secure by Letters Patent is:

1. In an apparatus for denaturing flowable material comprising:
   (A) a receptacle for receiving such material;
   (B) a pump connected to the receptacle for pumping the material therefrom;
   (C) a denaturing head connected to the pump for receiving said material from the pump;
   (D) a reservoir for containing a flowable denaturing agent; and
   (E) a pump for the agent connected to the reservoir and to the head for pumping the agent from the reservoir to the head; the improvement in which the head comprises:
   (1) an elongated tubular injector having opposite end portions and being connected to the material pump to receive said material therefrom for flow therethrough;
   (2) means mounting the injector in a substantially horizontal position for pivotal elevational movement of an end portion thereof;
   (3) scales connected to the injector at a position spaced from the mounting means in resiliently supporting relation to the pivotal elevational end porion thereof, said end portion being adapted to receive a sack in predetermined position pendantly supported thereon with said end portion having a port within the sack;
   (4) a duct within the injector connected to the pump for the agent being adapted to receive the agent therefrom and having an outlet adjacent to the port in fixed position within the injector disposed longitudinally of the injector toward the port for the emission of agent in the direction of material flow therepast, said injector being adapted to pivot downwardly against the supporting action of the scales when the sack and its contents reach a predetermined weight; and
   (5) means connected to the pumps responsive to downward pivotal movement of said end portion of the injector to interrupt pump operation in response to such downward pivotal movement.

2. An apparatus for denaturing comminuted flowable meat comprising:
   (A) an elongated substantially straight tubular injector having opposite end portions;
   (B) means connected to an end portion of the injector mounting the injector in a substantially horizontal position for elevational pivotal movement of the opposite end portion of the injector;
   (C) scales connected to the injector intermediate tthe end portions thereof in resiliently supporting relation to said opposite end portion, said opposite end portion being supported in cantilever extension from the scales slidably to receive a sack in predetermined position in pendantly supported relation thereon with said opposite end portion of the injector within the sack, the opposite end portion of the injector having a closed pointed end to guide a sack slid thereon and a downwardly disposed port adjacent to the pointed end within the sack when the sack is in said predetermined position thereon;
   (D) means for delivering comminuted flowable meat under pressure to the mounted end portion of the injector for extrusion therethrough into the sack;
   (E) a duct having an outlet in fixed position within the injector adjacent to the port disposed in the direction of the extrusion of comminuted meat therepast;
   (F) means for delivering dye under pressure to the duct, said injector being adapted to pivot downwardly against the supporting action of the scales when the sack and its contents reach a predetermined weight; and
   (G) means responsive to downward pivotal movement of the injector for interrupting operation of the meat delivering means and the dye delivering means when the injector pivots downwardly.

3. The apparatus of claim 2 in which the injector is of substantially constant transverse dimensions and shape from its mounted end portion to its port; the duct enters the mounted end portion of the injector and extends longitudinally of the injector internally substantially parallel to the injector and is of substantially constant transverse dimensions and shape throughout its length in the injector; and the port is substantially midway through the sack whereby comminuted meat extruded through the injector is longitudinally striped by dye emitted from the duct and the longitudinally striped comminuted meat coils back and forth as it descends in the sack to form a mass of marbled streaks of dye.

4. The apparatus of claim 2 in which the scales comprise a substantially horizontal beam having opposite end portions; means mounting the beam above the injector for elevational pivotal movement about a pivotal axis substantially parallel to the pivotal axis of the injector and intermediate opposite end portions of the beam; a link interconnecting an end portion of the beam and the injector at a position in spaced relation to the closed end of the injector and therebetween defining said predetermined position of the sack on the injector; and an adjustable weight mounted on the end portion of the beam opposite to the link in supporting relation to said opposite end portion of the injector and the sack and contents thereof.

* * * * *